Jan. 12, 1926.  1,569,344
F. W. WEST
SPEEDOMETER DRIVE
Filed March 8, 1923  2 Sheets-Sheet 1

INVENTOR
Frank W. West
BY
Warren S. Orton
ATTORNEY

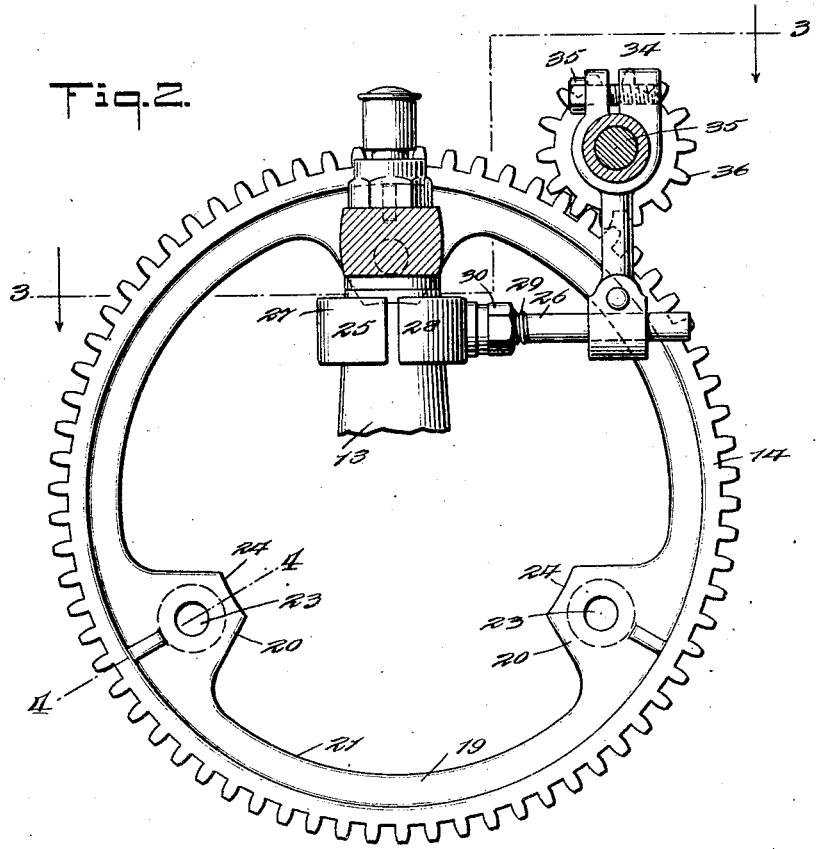
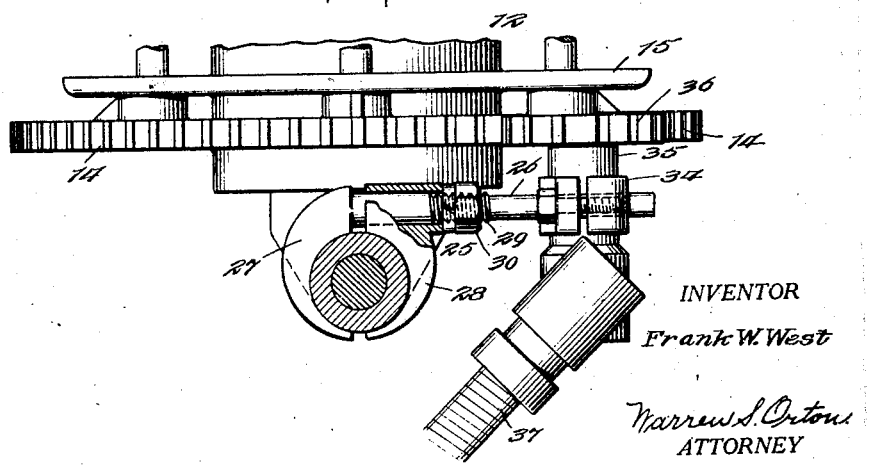

Patented Jan. 12, 1926.

1,569,344

UNITED STATES PATENT OFFICE.

FRANK WILLIAM WEST, OF NEW ROCHELLE, NEW YORK, ASSIGNOR, BY MESNE ASSIGNMENTS, TO STEWART-WARNER SPEEDOMETER CORPORATION.

SPEEDOMETER DRIVE.

Application filed March 8, 1923. Serial No. 623,820.

*To all whom it may concern:*

Be it known that I, FRANK W. WEST, a citizen of the United States, and resident of New Rochelle, in the county of Westchester and State of New York, have invented certain new and useful Improvements in Speedometer Drives, of which the following is a specification.

The invention relates to a speedometer drive of the type in which a gear driven shaft is mounted on the steering knuckle to turn therewith and disposed in permanent driving connection with a gear carried by the adjacent road wheel of a vehicle and the present disclosure constitutes another physical embodiment of the invention disclosed in my copending application, Serial No. 574,732, filed July 13, 1922 and in part constitutes a continuation of the invention disclosed in said pending application.

The invention specifically relates to a complete article of manufacture which constitutes an attachment provided with means for readily mounting the same in position on the spindle of the steering knuckle and which includes driving mechanism arranged to convey rotary motion from a gear on the road wheel through a pinion carried by the spindle to the usual form of flexible shaftings commonly employed in driving vehicle speedometers, and the invention particularly relates to a form of attachment which is designed to utilize the limited available space between the upstanding element of the steering knuckle and the adjacent side of the wheel confined largely within this space and without extending a material distance above the axle carrying the steering knuckle.

In such constructions it is a commercial requirement that the attachment be of such character that it can be readily installed in position and in which the usual exposed pinion can be readily and quickly adjusted to mesh with the gear on the road wheel.

Accordingly, one of the objects of the invention is to provide a simplified and inexpensive construction which will provide a compact and easily manipulated attachment to the steering knuckle and which will provide for ready setting of the pinion in its meshing relation with the driving wheel gear.

Still featuring economy in cost of construction, another feature of the invention is to provide a form of wheel gear which can be formed of a relatively small amount of material and which at the same time will have the material apportioned and arranged to provide a reinforced gear capable of withstanding the strains to which such gears are subjected when in active use and which strain resisting parts can be utilized additionally for the purpose of securing the gear to the wheel.

Still another object of the gear feature of the disclosure is to provide a form of gear which can be readily assembled with other similar gears, or rather gear blanks on a mandrel in such way that a large number of the gear blanks can be machined at the same time and in this way provide for proper dimensions and with the proper form of gear teeth to all of the gears in the set.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 2 is a vertical transverse sectional view of the device shown in Figure 1 taken on the broken line 2—2 looking in the direction indicated by the arrows and with the wheel omitted;

Figure 3 is a horizontal sectional view taken through the showing in Figure 2 and taken on the broken line 3—3 of this figure looking downwardly as indicated by the arrows.

Figure 1:
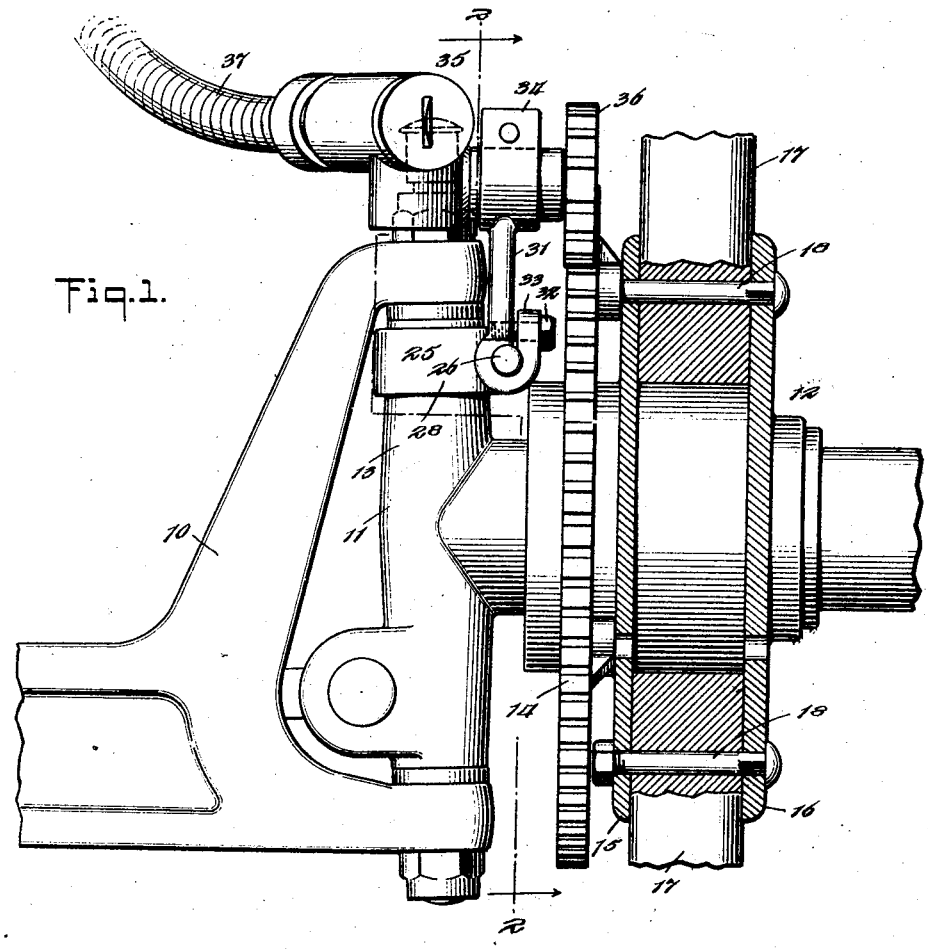
Figure 1 is a view in front elevation showing the upper part of a conventional form of steering knuckle and associated parts with a preferred embodiment of the invention mounted thereon and with parts of the wheel hub broken away.

In the following description and in the claims, parts will be identified by specific names for convenience of expression but they are intended to be as generic in their application to similar parts as the art will permit.

In the drawings there is shown part of a conventional form of vehicle axle 10 pivotally supporting a steering knuckle 11 upon which is rotatably mounted a road wheel 12 and which knuckle includes an upstanding spindle or knuckle element 13. As is usual in constructions where the speedometer is driven from the road wheel it is provided on its inner side with a gear 14 co-axially positioned on the same outside of the knuckle. In the showing the wheel is of conventional form with hub plates 15 and 16 from between which extend spokes 17 held together by means of the usual through bolts 18.

Figure 4:
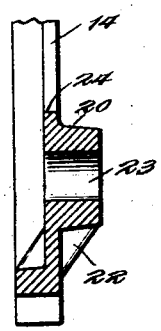
Figure 4 is a detailed transverse sectional view through one of the securing bosses and taken on the line 4—4 of Figure 2.

The gear 14 is of the spur gear and includes a rim 19 which constitutes the major portion of the gear leaving the central portion open so as to form a spokeless hollow gear. A plurality of holding bosses 20, herein shown to be three in number and spaced 120° apart, considered circumferentially of the gear, project inwardly and radially from the inner periphery 21 of the rim 19. Referring to the showing in Figure 4 it is noted that the bosses extend inwardly, that is towards the wheel, and project laterally of the plane of the gear and beyond the outlines of the same so that each boss forms a relatively long sleeve reinforced by a buttress web 22. Each of the bosses is provided with a bolt hole 23 and it is understood that some of the bolts 18 are of sufficient length to extend through the bolt holes 23 and in this way certain of the usual hub bolts function additionally to secure the gear to the wheel. The inner edges 24 of each of the bosses 20 is concaved and all of the edges are tangent to an inscribed concentric circle. By forming the gear blanks in this way it is possible to mount the blanks on a mandrel with the edges 24 engaging the same and thus acting to center the blanks. The blank gears are stacked on the mandrel in abutting contact considered axially, which arrangement is rendered possible by staggering the bosses of adjacent gears with the bosses of one gear projecting into the spaces between the bosses of the next adjacent gear. With the blank gears thus secured on the mandrel it is possible in machining the gears to cut all of the gear teeth of a plurality of gears by one cutting operation. By machining a number of gears at the same time the cost of cutting each gear is minimized and the set of gears mutually reinforce each gear during the machining operations.

The attachment carried by the spindle includes a bracket 25 for engaging the spindle 13 and a shaft bearing for carrying the usual gear driven pinion. The bracket constitutes a horizontally disposed and forwardly extending support rod 26, one end of which is defined by a hook 27 shaped to engage one side of the spindle element 13 as shown more particularly in Figure 3. Slidably mounted upon the rod 26 is a jaw element 28 coacting with the hooked end 27 to form a two-jaw clutch. A portion of the rod 26 is threaded as shown at 29 and a lock nut 30 or set of same threaded on the rod 26 bears against the jaw element 28 to force the same into clutching engagement with the spindle element.

It is understood by this construction that it is possible to loosen the nut or nuts and separate the clutch jaws sufficient to permit the bracket to engage opposite sides of the spindle without necessity of demounting the spindle or any part thereof in order to mount the bracket in place. With the jaws in their desired position adjusted vertically on the spindle and with the bracket set at any desired angle relative to the normal plane of travel of the wheel the nut can be tightened into a locking position. An upstanding post 31 is adjustably mounted on the supporting rod 26 and for this purpose the lower end of the post 31 is bent back upon itself, as shown more particularly in Figure 1, so as to encircle the rod 26 and thus form an integral jaw clamp. A jam bolt 32 acts on the free lower end 33 of the rod which is broadened to form a strap to draw the parts together and thus clamp the post to the rod. The upper end of the post 31 is similarly enlarged to form an integral jaw clutch 34 for securing in place a bearing unit 35, more particularly defined in the above identified copending application. Similarly a jam bolt 35 acts to clamp the jaws of the upper integral clutch about the bearing unit 35. The bearing 35 is preferably a single casting and has journalled therein two intermeshed shafts extending at an angle to each other as featured in the companion case. One of the shafts 35 has a pinion 36 secured thereto at one end and meshing with the gear 14. The other shaft is operatively connected to drive the speedometer (not shown) through the usual flexible driving connection 37.

By means of the construction disclosed it is obvious that the bracket may be positioned on the steering knuckle in any desired position thereon considered vertically and that the post supporting rod may extend forwardly of the vehicle as disclosed in the drawing or at any desired angle considered circumferentially of the axis of the spindle. By adjusting the upstanding post from front to rear along the rod and by adjusting the bearing unit in the support therefor provided at the upper end of the post, an adjustment is provided for the pinion horizontally in two directions at right angles to each other. In this way a nicety of adjustment is provided for the pinion so that the pinion may be caused to mesh with the gear at any desired or suitable place considered circumferentially of the gear. Ready access is provided to the several adjustable features and it is possible to readjust the pinion with relation to its gear so as to compensate for wear or irregularity in fit after the construction has been in use for awhile.

In certain types of road wheels, such for instance as the wheels used on the standard Ford car, the hub plates are secured together by six bolts. In mounting the gear 14 on such a wheel it is necessary to remove only three of the usual bolts 18 leaving the other and alternate bolts to maintain the wheel parts in position. There is therefore no necessity for dismantling the wheel. The holes of the removed bolts can then be utilized to receive the longer bolts necessary in the present disclosure to secure the gear in place. In this way there is no necessity of providing separate bolt holes for receiving the gear holding bolts. As the apertures 23 are 120° apart the bolt holes are already positioned correctly to receive the three bolts passed through the gear apertures and there is no necessity for using a special device for locating the gear.

Having thus described my invention, I claim:

1. In a speedometer drive, the combination with a road wheel, an axle therefor having a steering knuckle including an upstanding spindle member and a gear coaxially positioned on the road wheel outside of the knuckle, of a speedometer driving attachment including a clamp for engaging the spindle and including a forwardly extending supporting rod, an upstanding post horizontally adjustable on the rod, means for securing the post to the rod in adjusted position and a speedometer driving unit including a bearing member, a pair of intergeared shafts journalled in the bearing member with their axes fixed therein, one of said shafts provided with a pinion adapted to mesh with the wheel gear and means for securing the bearing member in adjusted position on the post thereby to set the pinion in meshing relation with the gear.

2. An attachment for a vehicle steering knuckle, comprising a clamp one jaw of which is provided with an outstanding supporting rod, an upstanding post and the coacting jaw of the clamp being each adjustable on said rod, a bearing secured to the upper part of the post, a pair of intergeared shafts journalled in said bearing, one of said shafts provided with an exposed pinion adapted to mesh with a road wheel driven gear and the other shaft adapted to be connected to a speedometer.

3. In a speedometer drive, the combination with an upstanding element of a steering knuckle, of a bracket including a rod having a hooked end engaging one side of the element and having a threaded portion in spaced relation to the hooked end, a jaw element slidable on the rod, engaging the side of the element opposite the hooked end and coacting with said end to form a two-jawed clutch, a nut engaging the threads of the rod and acting on the jaw element to force the same into clutching engagement with the element and a speedometer driving shaft carried by the rod.

4. In a speedometer drive, the combination of a bracket including a rod having a hooked end and having a threaded portion in spaced relation to the hooked end, a jaw element slidable on the rod coacting with said end to form a two-jawed clutch, a nut engaging the threads of the rod and acting on the jaw element to force the same into clutching engagement and a speedometer driving shaft carried by the rod.

5. In a speedometer drive the combination with an upstanding element of a steering knuckle, of a bracket for engaging the knuckle without demounting any part of the same, said bracket including a two-jaw clutch with the jaws separable to engage opposite sides of the knuckle element, a nut for securing the jaws in clutching relation, a bearing carried by the bracket, and a speedometer driving shaft journalled in the bearing.

6. An open-center speedometer driving gear including a rim and three bosses disposed 120° apart considered circumferentially of the gear and each boss projecting laterally of the plane of the gear and beyond the outline of the same whereby said gear may be stacked with similar gears in abutting relation axially and with the bosses in relative offset relation circumferentially considered, the inner edges of said bosses defining an inscribed circle and when assembled adapted to engage a mandrel passed through the centers of the gears.

Signed at New Rochelle, in the county of Westchester and State of New York, this 26th day of Feb. A. D. 1923.

FRANK WILLIAM WEST.